United States Patent Office 3,326,634
Patented June 20, 1967

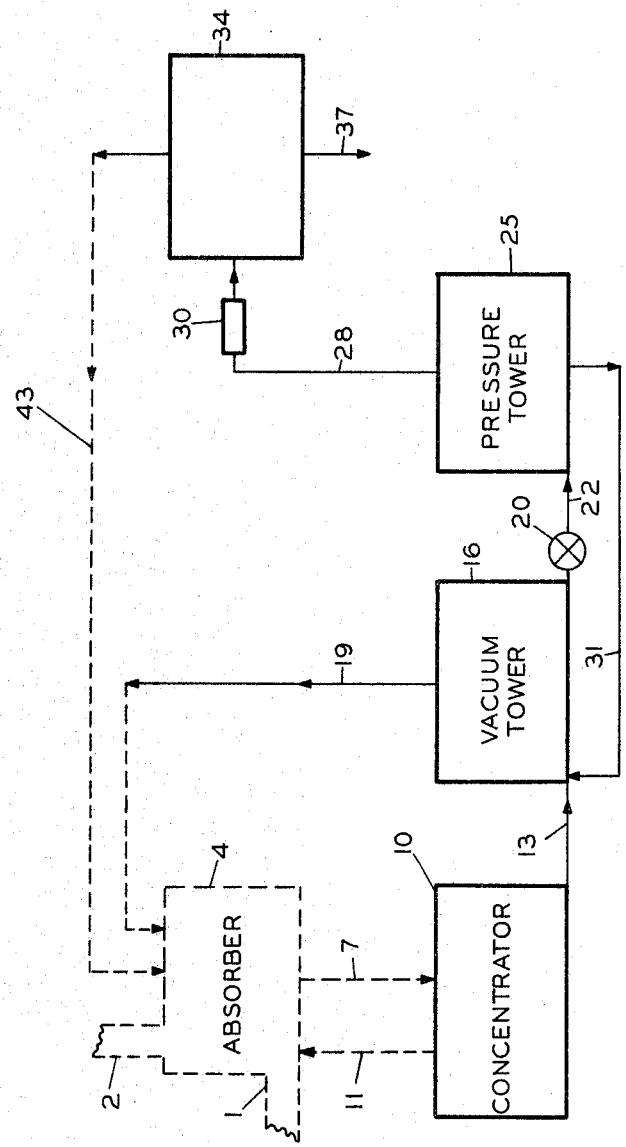

3,326,634
PROCESSES FOR RECOVERING HYDROGEN FLUORIDE
J. Cheairs Porter, Crestwood, Mo. (8717 Park Crestwood Drive, St. Louis, Mo. 63126), and John Houseman, 477 S. El Molino Ave., Apt. 9, Pasadena, Calif. 91106
Filed Dec. 4, 1963, Ser. No. 327,918
9 Claims. (Cl. 23—153)

The present invention relates to a novel process for recovering hydrogen fluoride from mixtures of hydrogen fluoride with silicon tetrafluoride. More particularly, this invention relates to a process for concentrating hydrogen fluoride (HF) in admixture with silicon tetrafluoride and water, and subsequently removing the HF therefrom.

Demand for fluorine, fluorine-containing materials such as fluorocarbons and the like, and consequently for hydrogen fluoride is increasing significantly every year. Because of this increasing demand, authoritative estimates have been made that within the very near future, domestic reserves of the main source of fluorine (i.e., high assay fluorspar) will be greatly diminished. One additional source of fluorine, which source can potentially relieve a great deal of the potential shortage of fluorine which might otherwise develop as a result of the consumption of most of the domestic high assay fluorspar, is hydrofluoric acid from "by-product" or "waste" gases from many chemical processes, including for example, processes for manufacturing so-called "wet process" phosphoric acid via the acidulation of phosphate rock with sulfuric and/or hydrochloric acid. During the acidulation step in such "wet acid" processes, phosphate rock, which usually contains several weight percent of fluorine, is treated preferably with sulfuric acid and some of the fluorine in the rock is converted to HF, which in turn is believed to react with silica ($SiO_2$) to form silicon tetrafluoride ($SiF_4$), which is evolved as a gas along with some of the HF. Such gases (HF and $SiF_4$) are generally extremely dilute when they are produced, and are frequently scrubbed with water to prevent the fluorine compounds from escaping into the atmosphere.

In aqueous solutions the fluorine compounds combine to form fluosilicic acid ($H_2SiF_6$) according to the reactions:

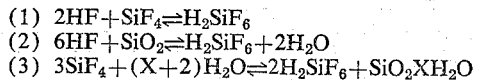

In practice scrubbing solutions can be concentrated only to the extent of about 15% of fluosilicic acid by absorption in recirculated acidic solutions.

Previous efforts to recover useful fluorine compounds from solutions of $H_2SiF_6$ have been primarily directed to strictly chemical processes. For example, reaction with NaCl gives $Na_2SiF_6$.

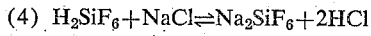

Unfortunately, the market for such inorganic fluosilicates is relatively small. Efforts have also been made to prepare very concentrated fluosilicic acid solutions by evaporating some of the water therefrom. However, it was found that aqueous fluosilicic acid solutions from an azeotrope at atmospheric presssure, yielding a constant boiling mixture containing about 10% HF and 36% $H_2SiF_6$. The azeotrope formation, in turn, frustrates efforts to separate the individual components (including HF) by ordinary distillation techniques. Efforts continue, however, in the search for a method for separating HF from such concentrated aqueous solutions of fluosilicic acid because these solutions are potentially a very inexpensive source of fluorine.

It is an object of the present invention to provide novel, relatively inexpensive processes for the recovery of hydrogen fluoride from concentrated aqueous solutions of fluosilicic acid.

It is another object of the present invention to provide relatively inexpensive overall processes for removal, concentration, and subsequent isolation and recovery of hydrogen fluoride gas from fairly dilute gaseous mixtures containing hydrogen fluoride.

These objects, as well as others which will become apparent from the following discussion and claims, are accomplished by properly utilizing the discovery that aqueous $H_2SiF_6$ solutions, which can be concentrated to concentrations (of $H_2SiF_6$) of as much as 60 weight percent or more by subjecting the solutions to a vacuum, yield a distillate extremely rich in HF gas when these very concentrated solutions are subsequently distilled under significantly higher pressures. Briefly stated, the generic processes of the present invention involve the distilling of a "super" concentrated aqueous solution of $H_2SiF_6$ (containing at least about 37 weight percent of $H_2SiF_6$) under a pressure of at least about one-half atmosphere in order to cause a significant portion of the solution to evaporate. The distillate, consisting of HF and $SiF_4$, but very little water, can be subjected to a conventional fractional distillation in order to isolate the HF, if desired. For a more detailed description of the invention, reference is made to the accompanying drawing.

The figure represents a specific embodiment of the invention comprising a vacuum tower 16, in which aqueous solutions of $H_2SiF_6$ are distilled under reduced (below atmospheric) pressures in order to increase the $H_2SiF_6$ concentration in the residue. The aqueous $H_2SiF_6$ solutions, generally containing at most about 25 weight percent of $H_2SiF_6$, are introduced into vacuum tower 16 through conduit 13, and distillate is removed from vacuum tower 16 through line 19 with the residue in vacuum tower 16 becoming "super" concentrated at the reduced pressure. The aqueous "super" concentrated solution of $H_2SiF_6$ then flows through the pump 20 into conduit 22 to pressure tower 25, where, by means of distillation at the increased pressure, some of the $H_2SiF_6$ decomposes into an enriched gas stream containing largely gaseous HF and $SiF_4$, which are passed through line 28 to a conventional fractional distillation column in which the HF is separated from the $SiF_4$. Water can be eliminated from this enriched gas stream by passing the gas stream through a concentrated sulfuric acid dehydrator 30 if desired. Isolated HF gas is removed from the still through line 37 to suitable storage facilities, while the $SiF_4$ can be recycled to be intermixed with the aqueous absorption solution in the absorber 4 through conduit 43 in order to facilitate the absorption of HF from the very dilute process gas stream which is introduced into absorber 4 through line 1. Similarly, the aqueous $H_2SiF_6$ residue solution from pressure tower 25 can be recycled through line 31 into the vacuum tower 16 to be reconcentrated by the vacuum distillation.

While aqueous solutions of $H_2SiF_6$ that are initially fairly dilute (i.e., those directly from a gas absorption step) can be subjected to the vacuum distillation step described hereinbefore, and "super" concentrated $H_2SiF_6$ solutions can thus be made directly from such fairly dilute aqueous solutions, it is generally more economical to first concentrate these fairly dilute "absorber" solutions to at least some extent at about atmospheric pressure before they are subjected to reduced pressures. Thus "absorption" solutions from absorber 4 in the figure, which solutions can generally economically contain at most about 10–15 weight percent of $H_2SiF_6$ are withdrawn through conduit 7 to a concentrator still 10, in which the solutions are distilled under about atmospheric pressure, thereby approaching concentrations of $H_2SiF_6$ in the residue closely approximating the azeotropic (at 1 atmosphere) concentration of about 36 weight percent of $H_2SiF_6$. It is these more concentrated solutions of $H_2SiF_6$ that are the preferred "raw" material for introduction into vacuum tower 16 through conduit 13. Distillate from concentrator 10 can then be recycled through line 11 into absorber 4, if desired.

The term "'super' concentrated $H_2SiF_6$ solutions" is herein intended to encompass all of those aqueous solutions that are more concentrated in $H_2SiF_6$ than the azeotrope mixture (at 1 atmosphere) referred to above. Since the concentration of $H_2SiF_6$ in the azeotropic mixtures at about 1 atmosphere is about 36 weight percent, then it can readily be seen that "super" concentrated $H_2SiF_6$ solutions (resulting from a vacuum distillation step such as that described above, for example) are those that contain more than this amount of $H_2SiF_6$.

The essential characteristic of the present processes is that the "super" concentrated $H_2SiF_6$ solution be redistilled under a pressure greater than that at which the particular $H_2SiF_6$ solution is an azeotropic mixture. Thus, for "super" concentrated solutions containing at least about 37 weight percent of $H_2SiF_6$, distillation under a pressure of at least about one-half of an atmosphere (or at least about 380 mm.-Hg pressure) meets this requirement. And while there is theoretically no upper pressure limit at this stage of the processes of the present invention under which the processes are inoperative, generally at most about 50 atmospheres (or about 38,000 mm.-Hg) of pressure will be more than adequate pressure to result in the evolution of the HF (and $SiF_4$)-rich gases from the "super" concentrated $H_2SiF_6$ solutions. Heat can be applied to the "super" concentrated $H_2SiF_6$ solutions in pressure tower 25 via any conventional or desired means.

It will generally be most convenient and most satisfactory to operate the processes such as that which is illustrated by the figure on a continous steady-state basis, withdrawing from the process the HF-rich gases from the pressure tower, recirculating the residue from the pressure tower to the vacuum tower, and at the same time introducing fresh concentrated $H_2SiF_6$ solution into the vacuum tower from the concentrator. It should be readily apparent, however, that a continuous steady-state operation is not necessary to successfully utilize the invention. It will also be readily apparent that the particular manner in which the concentrated, as well as the "super" concentrated $H_2SiF_6$ solutions described above are acquired or manufactured is not at all an essential feature of the present generic invention. For example, "super" concentrated $H_2SiF_6$ solutions that are prepared by a non-distillation process for the preferential removal of the water (i.e., by preferentially absorbing the water from the $H_2SiF_4$ solution by converting it into a chemical hydrate having a relatively low vapor pressure) can also be used in the successful practice of the present invention.

Further details and advantages that result from practicing the present invention will become apparent from the following examples, in which all "parts" are by weight unless otherwise specified.

*Example I*

Six thousand parts of "super" concentrated $H_2SiF_6$, containing 52 weight percent of $H_2SiF_6$ are introduced into the top of a conventional distillation still with a water cooled condenser and a reboiler over a period of three hours. The interior of the still is maintained at about 115° C. by means of thermostatically controlled electrical heating units placed through the still. The pressure in the still is maintained at about 1 atmosphere during this period of time. All of the gases evaporated from the still during this period of time are passed first through the condenser and then through a concentrated (95%) $H_2SO_4$ bath and collected in a paraffin lined tank.

The residue which is recovered from the bottom of the still consists of about 4750 parts of a 40.4 weight percent solution of $H_2SiF_6$.

The gases in the paraffin lined tank are essentially a mixture of 333 parts of HF with 867 parts of $SiF_4$, which are subsequently separated into pure HF and pure $SiF_4$ in a conventional fractional distillation column operated at 10 atmospheres pressure.

*Example II*

A typical kiln stack gas containing about 1.0 volume percent of hydrogen fluoride (dry gas basis) and about 0.5 volume percent of silicon tetrafluoride (dry gas basis) is contacted with a scrubbing solution containing 10 weight percent of fluosilicic acid and the remainder water which is sprayed into a scrubbing tower in which contact is made with the kiln stack gas at a temperature of about 90° C. The scrubbing solution withdrawn from the bottom of the tower (about 1000 parts) contains about 15 weight percent of $H_2SiF_6$, and the remainder water. This scrubbing solution is then concentrated in a differential distillation still operated at about 1 atmosphere of pressure until a constant temperature of about 115° C. is obtained. The resulting concentrated $H_2SiF_6$ solution contains about 36 weight percent of $H_2SiF_6$ and about 10 weight percent of HF. This concentrated solution is then flash distilled by introducing it slowly into a series of 5 vacuum chambers each maintained at about 5 mm.-Hg of pressure and at a temperature of about 45° C., yielding 220 parts of a "super" concentrated $H_2SiF_6$ solution (containing 54 weight percent of $H_2SiF_6$ and 5 weight percent of HF). This "super" concentrated $H_2SiF_6$ solution is withdrawn from the last of the vacuum chambers through a pump and then introduced slowly into a series of 5 chambers, each of which is maintained at a temperature of about 125° C. by external heating, and at a pressure of about 5 atmospheres. A total of 50 parts of HF and $SiF_4$ enriched gas are collected from these pressure chambers and fed into a conventional fractional distilling column operating at 10 atmospheres pressure. A total of 14 parts of practically pure HF and 36 parts of practically pure $SiF_4$ are recovered from the distilling column. In this example, SiF4 is totally recycled into the scrubbing tower where it is reabsorbed so that an additional 26 parts of HF (giving a total of 40 parts) is yielded in the final distillation process.

What is claimed is:
1. A process which comprises boiling a concentrated aqueous solution of fluosilicic acid at a temperature greater than 50° C. under more than one atmosphere of pressure; the concentration of said fluosilicic acid in said concentrated aqueous solution being greater than 37 weight percent; to thereby convert a significant portion of said fluosilicic acid into a final mixture of gaseous hydrogen fluoride and gaseous silicon tetrafluoride.

2. A process which comprises the steps of (a) subjecting an initial mixture containing hydrofluoric acid, less than 36 weight percent of fluosilicic acid, and water to a vacuum of at most about 0.25 atmosphere to thereby form a fluosilicic acid concentrate containing more than 37 weight percent of fluosilicic acid, and (b) subjecting said fluosilicic acid concentrate to a temperature greater than 50° C. and a pressure of more than one-half atmosphere to thereby convert a significant portion of said fluosilicic acid into a final mixture of gaseous hydrogen fluoride and gaseous silicon tetrafluoride.

3. A process as in claim 2, wherein at least a significant portion of said gaseous hydrogen fluoride is separated from said final mixture by fractionally distilling said final mixture.

4. A process as in claim 2, wherein said initial mixture is an azeotropic mixture of said water, said hydrogen fluoride, and said fluosilicic acid.

5. In a process for recovering hydrogen fluoride from a gaseous mixture containing hydrogen fluoride and silicon tetrafluoride, which process comprises the steps of forming an aqueous solution by contacting said gaseous mixture with water to thereby absorb into said water said hydrogen fluoride and said silicon tetrafluoride, and subsequently concentrating said aqueous solution to thereby form a concentrated mixture of water, HF, and $H_2SiF_6$ containing at least about 30 weight percent of said $H_2SiF_6$, the improvement which comprises subjecting said concentrated mixture to a vacuum of at most about 0.25 atmosphere to thereby form a fluosilicic acid concentrate containing more than 37 weight percent of fluosilicic acid, and subsequently subjecting said fluosilicic acid concentrate to a temperature greater than 50° C. and a pressure between 0.5 and about 50 atmospheres to thereby convert a significant portion of the fluosilicic acid in said fluosilicic acid concentrate into a final mixture of gaseous hydrogen fluoride and gaseous silicon tetrafluoride.

6. An improved process as in claim 5, wherein said hydrogen fluoride is removed from said final mixture of gaseous hydrogen fluoride and gaseous silicon tetrafluoride by fractionally distilling said final mixture.

7. An improved process as in claim 5, wherein said concentrated mixture is approximately an azeotropic mixture of water, HF, and $H_2SiF_6$ formed under a vacuum of at most about 0.25 atmosphere.

8. A process which comprises the steps of
  (a) forming a fluosilicic acid concentrate by subjecting a mixture consisting essentially of water, hydrogen fluoride, and less than 36 weight percent of fluosilicic acid to a reduced pressure between about 150 and about 0.5 mm. mercury to thereby increase the concentration of $H_2SiF_6$ in said mixture; said fluosilicic acid concentrate containing at least about 37 weight percent of fluosilicic acid; and
  (b) subsequently heating said fluosilicic acid concentrate at a temperature above about 80° C. and under a pressure of from 380 to about 38,000 mm. mercury to thereby convert a significant portion of said fluosilicic acid in said fluosilicic acid concentrate into a gaseous mixture of hydrogen fluoride gas and silicon tetrafluoride gas.

9. A process as in claim 8, wherein at least a significant portion of said hydrogen fluoride gas is removed from said gaseous mixture by fractionally distilling said gaseous mixture.

References Cited

UNITED STATES PATENTS

| | | | |
|---|---|---|---|
| 1,244,032 | 10/1917 | Chappell | 23—153 |
| 1,734,699 | 11/1929 | Wait | 159—47 |
| 1,851,652 | 3/1932 | Soll et al. | 23—153 |
| 1,903,408 | 4/1933 | Soll | 23—153 X |
| 1,906,399 | 5/1933 | Montgomery et al. | 23—306 |
| 2,296,118 | 9/1942 | Preisman | 23—153 |
| 2,343,635 | 3/1944 | Beekhuis | 23—306 X |
| 2,369,791 | 2/1945 | Moore | 23—153 X |
| 2,413,205 | 12/1946 | Word et al. | 23—153 X |
| 3,024,086 | 3/1962 | Cines | 23—153 |
| 3,218,129 | 11/1965 | Barker et al. | 23—153 |

FOREIGN PATENTS 617,506  4/1961  Canada.

OSCAR R. VERTIZ, *Primary Examiner.*

EDWARD STERN, *Examiner.*